United States Patent [19]
Huber

[11] 3,845,978
[45] Nov. 5, 1974

[54] SWIVELLED CARGO RELEASE DEVICE

[75] Inventor: John Richard Huber, Holicong, Pa.

[73] Assignee: Eastern Rotorcraft Corporation, Doylestown, Pa.

[22] Filed: Dec. 4, 1972

[21] Appl. No.: 311,446

[52] U.S. Cl............................ 294/83 R, 294/83 AB
[51] Int. Cl............................................. B66c 1/38
[58] Field of Search..... 294/75, 83 R, 83 A, 83 AB, 294/84; 89/1.5 R, 1.5 E, 1.5 G; 244/137 R

[56] References Cited
UNITED STATES PATENTS

| | | |
|---|---|---|
| 2,814,522 | 11/1957 | Palmer et al.................. 294/83 R X |
| 3,032,365 | 5/1962 | Campbell .................. 294/83 AB X |
| 3,068,034 | 12/1962 | Campbell.......................... 294/83 A |
| 3,337,255 | 8/1967 | Nicoloff......................... 294/83 R X |

Primary Examiner—Evon C. Blunk
Assistant Examiner—Johnny D. Cherry
Attorney, Agent, or Firm—Synnestvedt & Lechner

[57] ABSTRACT

A swiveled hook assembly including cargo release mechanism in which swiveled mechanical interlinks are employed to transfer power or motion across the swiveled hook housing interface.

13 Claims, 6 Drawing Figures

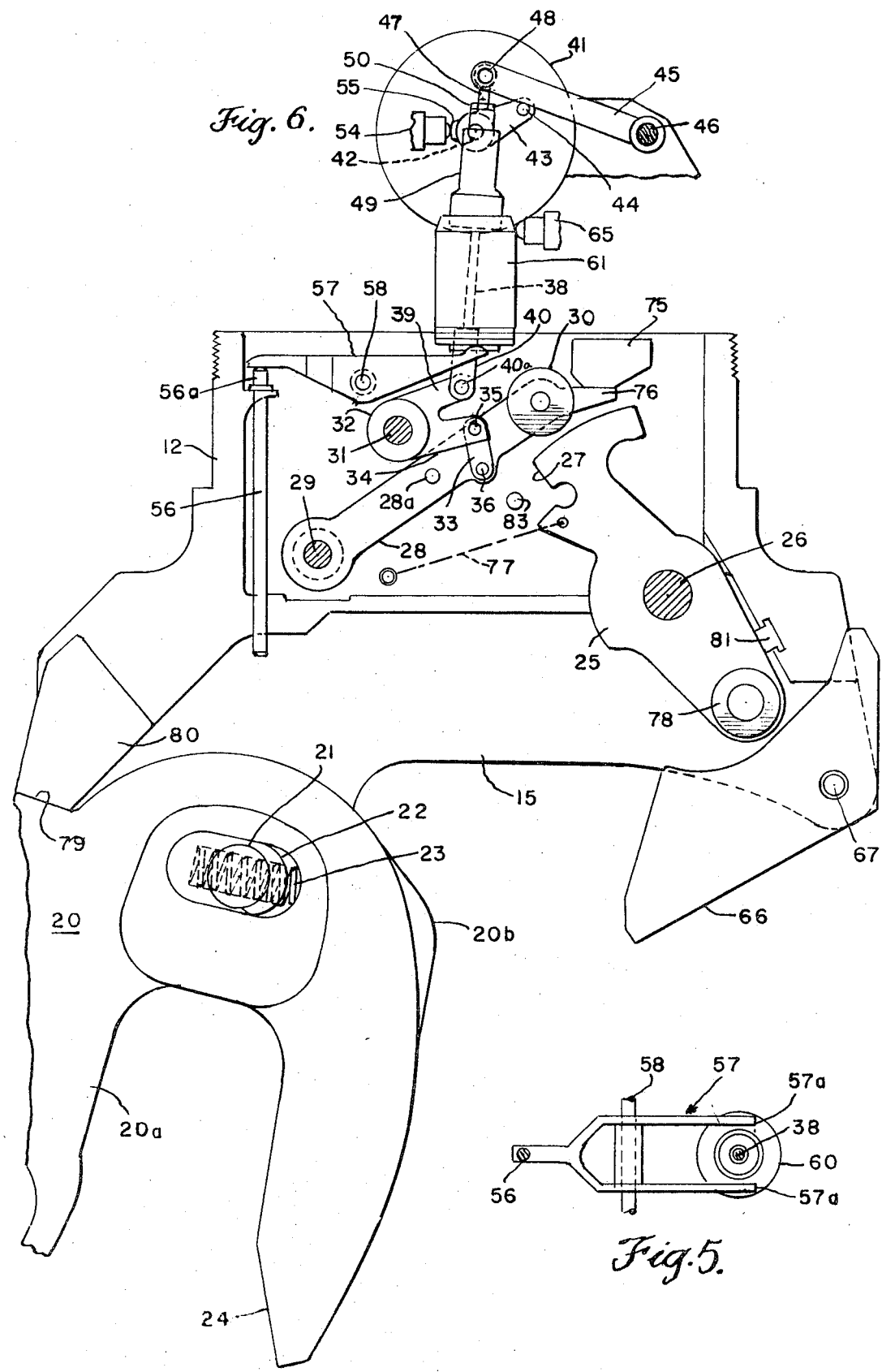

3,845,978

SWIVELLED CARGO RELEASE DEVICE

This invention relates to devices for engaging and releasing cargo supported in a slung position and is particularly suitable for use with remote controlled swiveled hooks.

Devices of the type with which the present invention is concerned are particularly adapted for use with helicopter type of aircraft in the lifting of external loads. The release device is supported either directly or by means of cables on the helicopter structure and the slung load is attached to the helicopter through the medium of the release device. Preferably the controls for the release device include a power operated release which may be operated by a control member mounted on the pilot's control stick. In this way the pilot has full control of the cargo release without removing his hand from the control stick. This power operated control may be an electrical device which would require only a push button control switch for actuation. In addition, it is usually desirable to incorporate manual controls (both remote and at the hook) so that in the event of power failure an emergency release may be accomplished. As is well known in devices of this type, the mechanism for locking the supporting beam in load carrying position should be positive in nature to resist accidental release under vibration or inertia forces. In addition, the mechanism should not be sensitive to small movements but at the same time should not require large forces in the control mechanism to cause the opening action.

Heretofore when remotely controlled electrically actuated release mechanisms were incorporated in a swiveled hook, the electrical wires for supplying the current and control to the hook usually enter the hook housing at or near the point of attachment of the supporting cable and transfer across the swiveling connection is made by a slip ring assembly. In actual use the hook device is sometimes submerged in water. This can cause corrosion at the slip ring assembly and shorting of the electrical system. Even if the electrical devices can be sealed against wetting, corroded slip rings have been found to be notoriously unreliable for transferring power across a swivel interface and malfunctions frequently occur.

Accordingly, it is a primary object of the present invention to provide a swiveled hook assembly with release mechanism in which swiveled mechanical interlinks are employed to transfer power or motion across the swiveled hook interface.

It is a further object of this invention to provide a cargo release device wherein the electrical controls are confined in a non-rotating water-tight housing portion of the swiveled hook.

How the foregoing objects and advantages as well as others incidental to the present invention are attained will be clear from the following of the drawings in which FIG. 1 is a vertical cross section of the cargo release device taken as indicated by the arrows 1—1 in FIG. 2.

FIG. 5 is a plan view from below of a portion of the control linkages taken as indicated by the arrows 5—5 in FIG. 3.

FIG. 6 is a more or less diagramatic view illustrating operative parts of the device in the beam unloading position.

Figure 1:
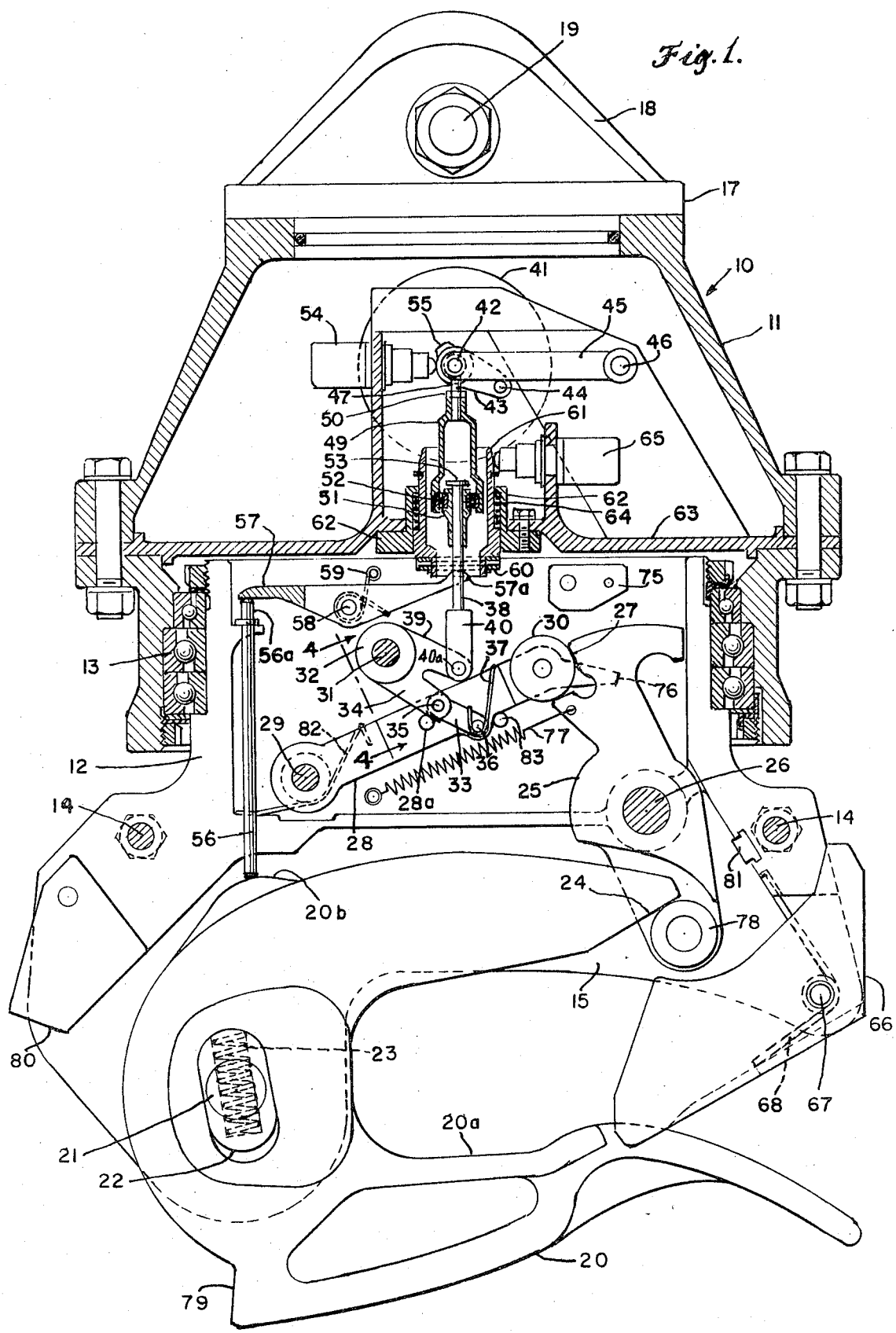

In the particular form of release device illustrated, the housing assembly 10 has an upper housing section 11, a lower housing section 12, and a swivel mounting means 13 interconnecting the upper and lower housing sections. The lower housing is formed by two half sections bolted 14 together to form the complete lower housing. The lower housing includes a supporting structure in the form of a pair of downwardly depending side plates 15 and 16 that are positioned on opposite sides of the housing centerline with one side plate on each of the lower half housing sections.

The top 17 of the upper housing includes a pair of space apart webs 18 bridged by a bolt 19 which can be used to attach shackles or other fittings to connect the release device to the cable of the lifting apparatus and support the release unit in load carrying position.

A load carrying beam 20 is pivotally supported on the supporting structure depending from the lower housing. Thus as can be seen in FIGS. 1 and 6, the beam 20 is mounted on a trunnion or pivot 21 between the housing side plates 15 and 16. The beam pivot 21 is positioned on an axis below the plane of the housing swivel 13 and parallel thereto. The beam pivot structure includes a trunnion block member 22 that houses spring 23 that actuates the automatic touchdown release of the hook, as will be subsequently described.

Figure 4:
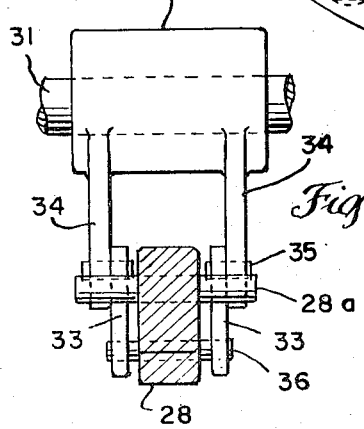
FIG. 4 is a somewhat enlarged cross section of the beam latch actuating mechanism taken as indicated by the arrows 4—4 in FIG. 1.

When beam 20 is in load carrying position as shown in FIG. 1, the beam end 24 opposite pivot 21 is supported by a load carrying beam latch 25 that is supported on the lower housing by means of latch pivot 26. The beam latch is adapted to hold the beam in load carrying position when the latch is closed as shown in FIG. 1 and to release the beam when open as shown in FIG. 6. When closed the upper end 27 of the beam latch 25 is engaged by a reaction lever 28 that forms part of a mechanical latch actuating mechanism that is positioned in the lower housing. The end of the reaction lever opposite the latch engaging end is mounted on a pivot 29 supported by the lower housing. The reaction lever 28 is provided with roller 30 that engages the upper portion 27 of the latch 25 and when so engaged prevents movement thereof. A latch actuating mechanism assists in holding the reaction lever in its load carrying position and in the opening of the latch to release the load. The shaft 31 is supported by the lower housing. Rigidly connected to shaft 31 is a two armed bell crank 32 (also see FIG. 4). A link 33 interconnects crank arm 34 with the reaction lever 28 by means of pivots 35 and 36. With the parts in the position shown in FIG. 1, crank arm 34 and link 33 form a toggle structure which is urged to the overcenter position by spring 37. The reaction lever 28 is provided with a stop engagement 28a to limit the overcenter position of the arm. In the FIG. 1 position the reaction lever 28 is locked in load carrying position. This prevents inadvertent opening due to vibration or inertia loads acting on the linkage by requiring first control movement for unloading the toggle linkage and then continued movement to move the reaction lever.

The latch operating mechanism positioned in the lower housing — i.e., the bell crank 32, link 33, and reaction lever 28 — is linked to a connecting rod 38 that extends between the upper and lower housings on an axis generally aligned with the housing swivel axis when the beam is in the load carrying position illustrated in FIG. 1. The connecting rod 38 is linked to the second arm 39 of bell crank 32 by means of yoke 40 through pivot 40a.

Connecting rod 38 is mounted so that it can move up and down on a generally vertical axis and in the upper housing there are means for imparting up and down movement thereto. In the illustrated embodiment a rotary solenoid 41 is employed for this purpose. The electrical connections from the operator to solenoid 41 are not shown but they can be connected thereto in any manner that will serve to preserve the water-tight integrity of the upper housing. Solenoid shaft 42 turns when the solenoid circuit is energized. Crank 43 is rigidly connected to shaft 42 and carries a crank pin 44 offset from the solenoid shaft axis on the crank arm. Pin 44 engages the under side of lever member 45 which is supported by a pivot 46 on the upper housing 11.

Figure 3:
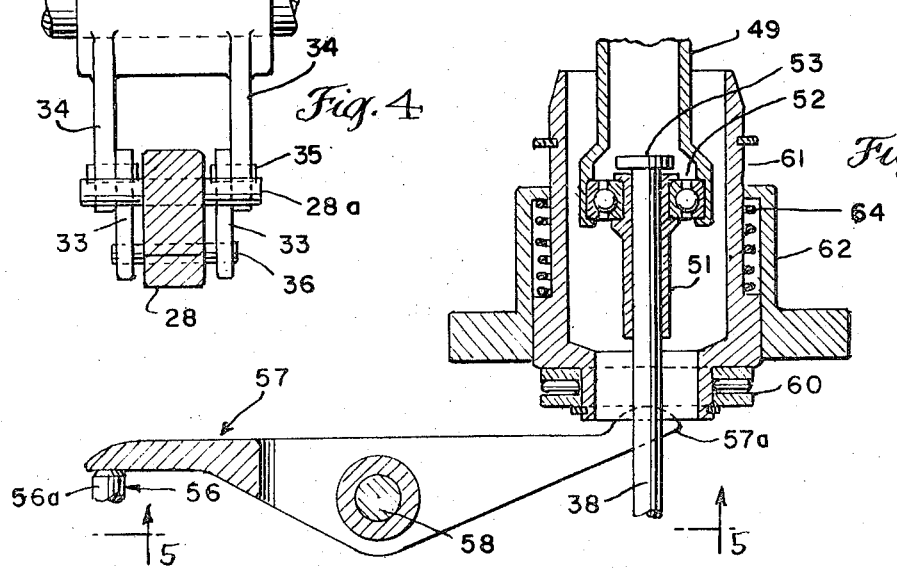
FIG. 3 is a somewhat enlarged cross section of a portion of the control linkages taken as indicated by the arrows 3—3 in FIG. 2.

Lever arm 45 is pivotally linked to the upper part of connecting rod 38 through eye bolt 47, pivot 48, thimble collar 49, lock nut 50, swivel 52 and sleeve 51. The thimble 49 and rod 38 are coaxilly aligned. A swivel mechanism 52 (whose swivel axis is concentric with the housing swivel axis when the connecting rod 38 is in the down position to close the beam latch) is mounted to rotatably link sleeve 51 and thimble 49. Connecting rod 38 passes through sleeve 51 thus permitting rod 49 to turn on its axis while thimble 38 remains stationary from the standpoint of rotation about the housing axis. As can be seen in FIGS. 1 and 3, connecting rod 38 is provided with an enlarged head 53 that will be engaged by the upper end of sleeve 51 when the swiveled mechanism is raised by upward movement of lever arm 45 on pivot 46. When the mechanism is in closed (beam loaded) position it is preferred to have rod head 53 separated slightly from the engagement surface of sleeve 51 so that slight inadvertent thimble movements will not trigger unlocking of the reaction lever toggle linkage.

To prevent injury to the solenoid 41, a safety switch 54 is provided. When the solenoid is energized and solenoid shaft 42 turns, a cam 55 rotates with the crank 43 and when it reaches the up position shown in FIG. 6, it actuates the safety switch 54 to cut off power to the solenoid.

Turning back to the automatic touchdown mechanism: pivot 21, trunnion block 22 and the biasing spring are so arranged that when the load on arm 20a of beam 20 is reduced to a predetermined value set by the size and compression of spring 23, the pivoted end of the beam will slide upwardly on trunnion block 22, from the position shown in FIG. 1 to the position shown in FIG. 6 and exert through beam cam 20b lifting pressure on push rod 56 that is mounted in the lower housing for up and down movement and which is maintained in engagement with beam cam 20b when the beam is in closed loaded position by the mechanism associated with spring 59 as will be described hereinafter. The upper end 56a of rod 56 bears against one end of a forked lever member 57 mounted on a pivot 58 supported on the lower housing 12. A torsion spring 59 serves to maintain contact between lever 57 and rod 56 and causes the lever to follow up and down movements of rod 56. The forked ends 57a (see FIG. 5) of lever 57 bear against the bottom race of roller bearing 60 whose rotational axis is concentric with the housing swivel axis. Roller bearing 60 is concentrically aligned with and secured to the bottom of sleeve member 61 which in turn is mounted to slide on a vertical axis in a bushing 62 set in the bottom wall 63 of the upper housing 11. Shoulders on the bushing 62 and sleeve 61 confine a spring member 64 under compression in the annular space between the sleeve 61 and bushing 62 when the beam is locked in load carrying position. The upper portion of sleeve 61 is engaged by a switch 65 that is in the electrical circuit of solenoid 41.

The connection between sleeve 61 and switch 65 is such that downward movement of the sleeve within the bushing (caused by spring 64 forcing the sleeve 61 to follow downward movements of lever arm 57a when rod 56 is raised by the shifting of beam 20 on its trunnion block) will actuate switch 65 and trigger solenoid 41 causing shaft 42 to turn and thereby actuate the latch mechanisms to open the latch and release the beam and load carried thereby. The touchdown release power circuit can also be provided with a switch remotely controlled by the pilot or operator to lock out the touchdown switch 65 and selectively prevent its functioning even though the load may be reduced below the preset minimum. Such arrangement is not shown but is well known in this art.

In the illustrated embodiment of the invention, housing, touchdown mechanism, and latch operating swivel axes are all concentrically aligned when the beam latch is closed. Further, the swiveled latch actuating connecting rod 38 passes through the sleeve member 61 of the touchdown assembly. Sleeve 61 must therefore be of sufficient size to accommodate the swivel mounting 52 associated with the latch actuating mechanism and to permit the rocking of the parts associated with connecting rod 38 when lever arm 45 is lifted to open the beam latch — i.e., to the position shown in FIG. 6.

Where it is desired to have the electrical components of the device housed in water-tight compartments it is necessary to seal the opening between the upper and lower housings formed by sleeve 61. This can be accomplished in many ways provided the seal allows for both up and down and rocking movements of the beam latch actuating mechanism. For example, an expansible bellows or other similar joint that will follow such movements can be interposed between sleeves 51 and 61.

Above the outer portion of the load carrying beam 20 a keeper 66 is mounted on the lower housing side plates 15 and 16 by pivot bolt 67. Spring 68 urges the keeper to reassume its closed position as shown in the drawings whenever it is displaced therefrom.

Figure 2:
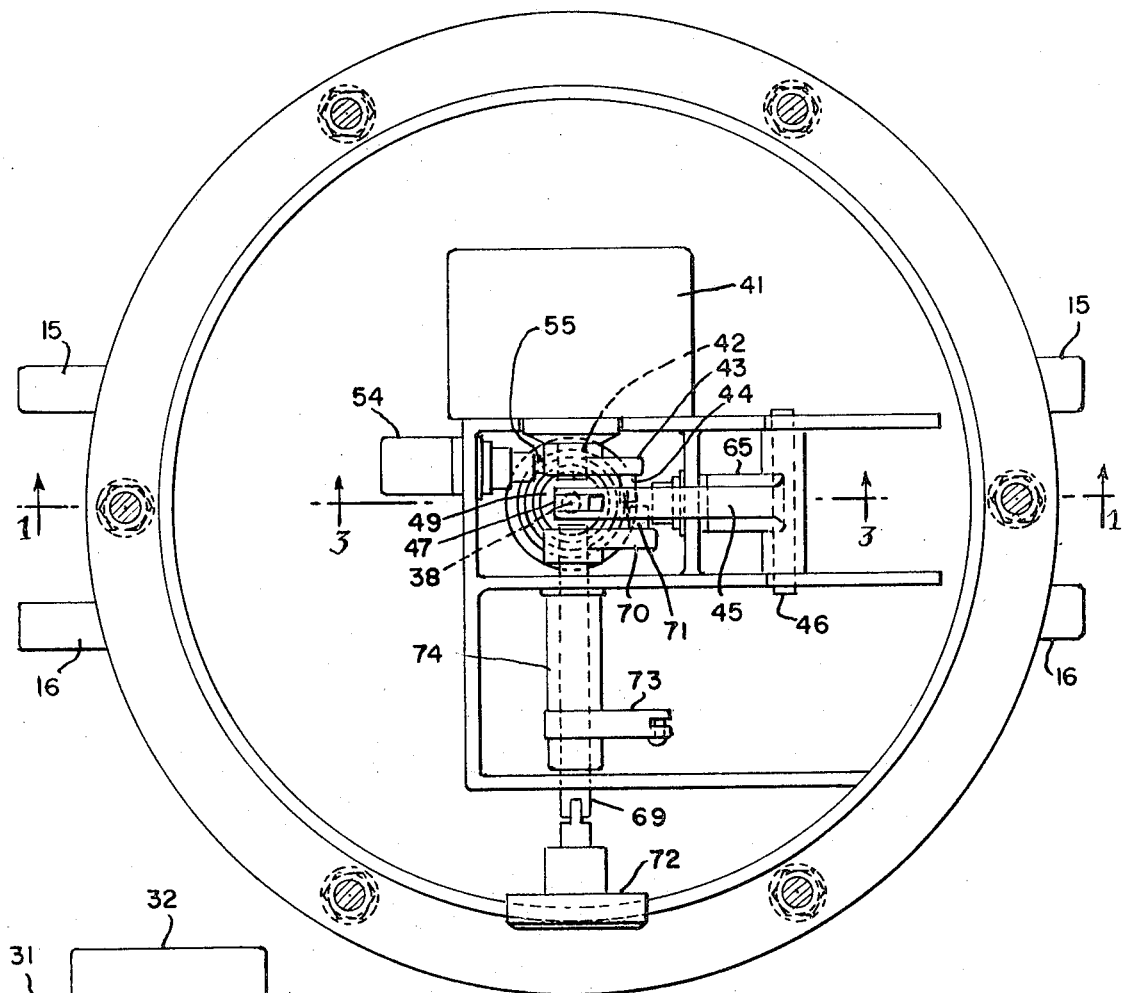
FIG. 2 is a plan view of the cargo release device of FIG. 1 with the top housing member removed.

The illustrated embodiment also includes means for manually releasing the load both at the hook or from a remote station. Such means can best be seen in FIG. 2. Shaft 69 is mounted on the upper housing and extends into the housing on an axis aligned with that of solenoid shaft 42. A crank member 70 is secured to the end of shaft 69 and crank pin 71 engages lever arm 45 in a manner similar to crank 43 and pin 44 so as to raise the lever arm 45 by turning shaft 69 on its axis. Turning of shaft 69 can be accomplished at the hook by knob 72 which is coupled to the shaft outside the housing or by a manual remote control — for example by means of a release cable running through a flexible sheath from outside the housing through a water-tight fitting into the upper housing where the cable is secured to a crank arm 73 of crank 74 secured to shaft 69.

To open the beam latch electrically and release the load on the beam, the pilot energizes solenoid 41 by closing his control switch. This causes solenoid shaft 42 to turn. Crank 43 which is coupled to shaft 42 will be raised and by means of pin 44 lift lever arm 45 from the position shown in FIG. 1 to the position shown in FIG. 6. The movement of lever 45 raises the swiveled connecting rod assembly (eyebolt 47, collar 49, sleeve 51, rod 38 and yoke 40) to operate the latch actuating mechanism in the lower housing (i.e., the two armed bell crank 32, link 33 and reaction lever 28) by turning bell crank 32 on its pivot axis and lift reaction lever 28 from load carrying engagement with the beam latch 25. An internal stop 75 serves to limit upward movement of reaction lever 28 by engaging an end projection 76 thereon. During the upward movement of the reaction lever 28, biasing spring 77 serves to maintain the latch head 27 in following contact with lever roller 30 until disengagement of the reaction lever with the latch is complete, at which point the biasing spring in cooperating with the rolling action of beam end 24 on latch roller 78 will cause the latch to be disengaged from the beam and permit the beam to rotate on its pivot 21 from the position shown in FIG. 1 to that shown in FIG. 6, thus releasing a slung load carried on beam arm 20a. A stop member 79 on beam 20 permits beam rotation on pivot 21 until it engages an elastomeric cushion 80 on the lower housing 12. A similar cushion 81 prevents damage to the latch and housing due to swinging movements of the latch.

After the load has been released the pilot opens his switch to solenoid 41. A reaction spring (not shown but positioned behind pivot 21 as viewed in FIG. 1) will cause the beam to return to its closed load position. Caming action of the beam end 24 against the latch will return the latch to its closed position. Since solenoid 41 is not energized, spring member 82 which was compressed during load release can urge reaction lever 28 back to battery against stop 83 mounted on the housing and into latch locking engagement; the return movements of the reaction lever also pull its associated control linkages from the open position of FIG. 6 into load carrying position shown in FIG. 1.

The touchdown control switch 65 can, if desired, be connected in the solenoid circuit in such a way that it will deactivate the solenoid when sleeve 61 is in the up position of FIG. 1 and when the load on the beam is above a predetermined minimum set by the size and compression of spring 23.

From the foregoing it will appear than an improved mechanism has been provided for use in swivel mounted cargo release hooks in which the electrical controls are mounted in a non-rotating housing section that can be rendered water-tight and positive mechanical linkages are employed to transfer motion or force across the housing swiveled interface.

I claim:

1. A cargo release device including:
   1. a housing assembly having:
      a. an upper housing section
      b. a lower housing section, and
      c. swivel mounting means interconnecting the upper and lower housing sections;
   2. the lower housing section including a downwardly depending supporting structure;
   3. a load carrying beam pivotally supported on said supporting structure,
      a. the beam pivot being positioned on an axis below the plane of the housing swivel and parallel thereto;
   4. a beam latch pivotally supported on said lower housing and adapted to hold the beam in load carrying position when closed and to release the beam when open;
   5. latch actuating mechanism positioned in the lower housing and linked to a connecting rod that extends between the upper and lower housings on an axis generally aligned with the housing swivel axis;
   6. said connecting rod being mounted for up and down movement along a generally vertical axis, and
   7. means within the upper housing for imparting up and down movement to the connecting rod, said means being linked to an upper portion of the connecting rod through a swivel mechanism whose swivel axis is concentric with the housing swivel axis when the beam is in closed load carrying position.

2. A cargo release device according to claim 1 wherein the means in the upper housing for imparting up and down movement to the connecting rod include a mechanical linkage system actuated by an electrically controlled device and the beam latch actuating mechanism links in the lower housing are mechanically operative.

3. A cargo release device according to claim 2 wherein the upper housing section is sealed to form a water-tight enclosure for an electrical device housed therein.

4. A cargo release device according to claim 2 including a touchdown mechanism for releasing the load from the beam when the load has been reduced to a predetermined minimum, said touchdown mechanism including means associated with the beam that can change position with a change in loading of the beam, a mechanical linkage system connected therewith and extending from the beam through the lower housing and into the upper housing, said mechanical linkage having a swivel joint whose axis is concentric with the housing swivel axis, and wherein the mechanical linkage portions in the upper housing are interconnected to and can actuage the means for imparting up and down movement to the swiveled connecting rod of the beam latch mechanism.

5. A cargo release device according to claim 4 wherein the mechanical touchdown linkage portions in the upper housing are operative to close a switch to actuate electrically operative means for imparting up and down movement to the swiveled connecting rod of the beam latch mechanism.

6. A load release device according to claim 4 wherein the mechanical touchdown linkage portions in the upper housing are operative to prevent the energizing of the circuit for opening the latch mechanism.

7. A cargo release device according to claim 1 wherein the means in the upper housing for imparting up and down movement to the connecting rod include a rotary solenoid and mechanical interlinks therefrom to the connecting rod for translating turning movement of the solenoid shaft to up and down rod movement.

8. A cargo release device according to claim 1 wherein the beam latch actuating mechanism operates a reaction lever that can be pivoted out of engagement with the beam latching mechanism to permit the opening of the beam.

9. A cargo release device according to claim 8 wherein the beam latch actuating mechanism is controlled by on over dead center linkage to secure the reaction lever in engaged position.

10. A cargo release device according to claim 1 including a touchdown mechanism for releasing the load from the beam when the load has been reduced to a predetermined minimum, said touchdown mechanism including means associated with the beam that can change position with a change in loading of the beam, a mechanical linkage system connected therewith and extending from the beam through the lower housing and into the upper housing, said mechanical linkage having a swivel joint whose axis is concentric with the housing swivel axis, and wherein the mechanical linkage portions in the upper housing are interconnected to and can actuate the means for imparting up and down movement to the swiveled connecting rod of the beam latch mechanism.

11. A cargo engaging and release device including
1. a housing assembly having:
   a. an upper housing section
   b. a lower housing section, and
   c. swivel mounting means interconnecting the upper and lower housing sections
2. a load carrying beam mounted on a pivot carried by the lower housing section
3. beam latching mechanism for holding the beam in load carrying position when closed and for releasing the beam from its load carrying position when open
4. a control system for operating the beam latching mechanism positioned in the upper housing section, and
5. a mechanical linkage for transmitting control movements from the control system to the beam latching mechanism across the swiveled interface of the housing sections, said mechanical linkage including a swivel joint whose axis is concentric with the housing swivel axis.

12. A device according to claim 11 wherein the control system for the beam operating latching mechanism is an electrical system.

13. A device according to claim 11 wherein the control system for the beam operating latching mechanism is a mechanical system.

* * * * *